Patented Oct. 9, 1928.

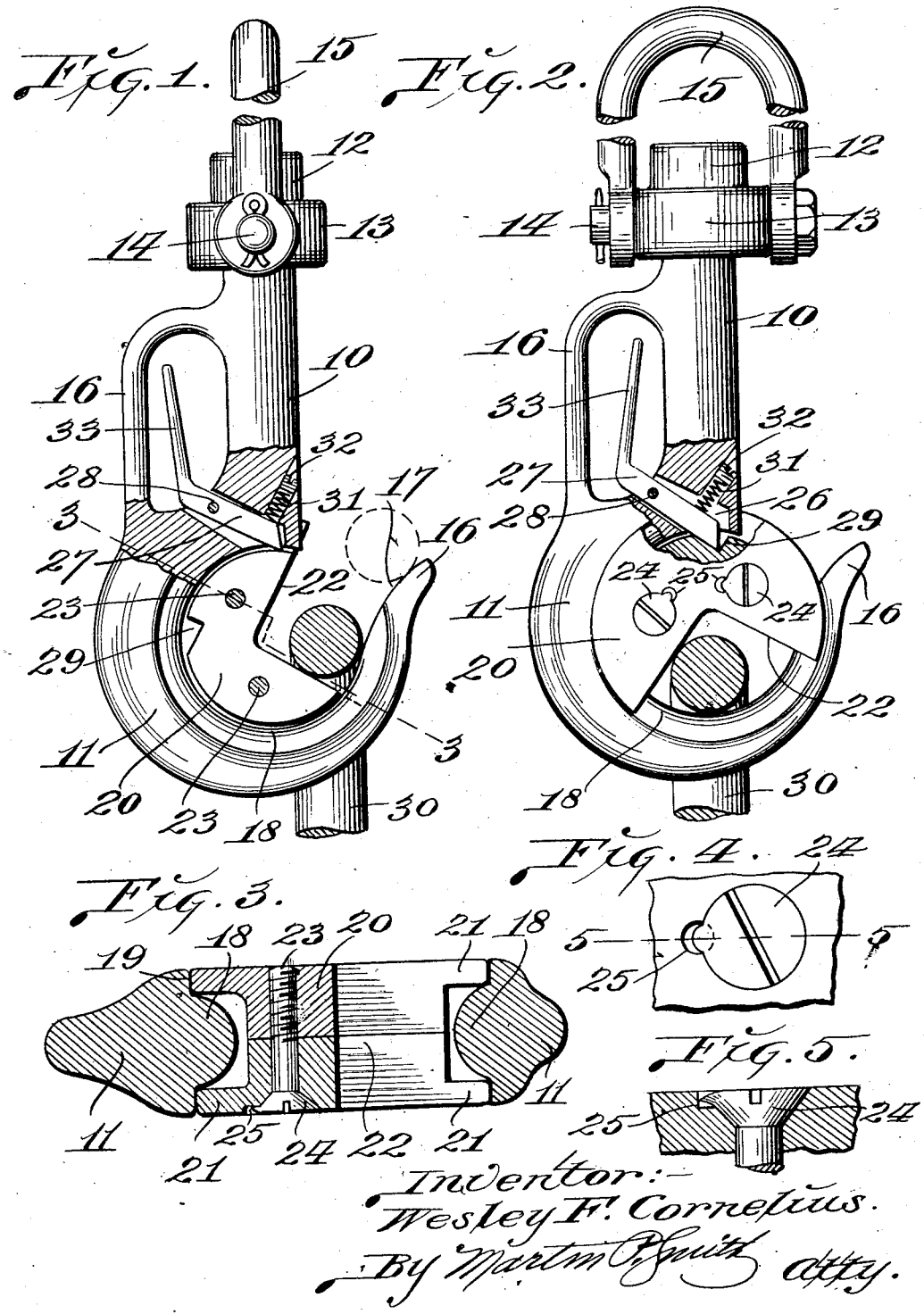

1,687,006

UNITED STATES PATENT OFFICE.

WESLEY F. CORNELIUS, OF WHITTIER, CALIFORNIA.

LATCHING HOOK FOR OIL-WELL ELEVATORS.

Application filed January 12, 1927. Serial No. 160,617.

My invention relates to a latching hook that is particularly designed for use in connection with the rod and tubing elevators of oil well derricks, the principal objects of my invention being to provide an elevator hook that is relatively simple in construction, inexpensive of manufacture and which is provided with relatively simple and easily operated means for positively locking the engaged link or bale.

Further objects of my invention are to provide a safety latch hook of the character referred to with manually operable means for positively locking the rotary latch when the same is in its link or bale securing position; to provide the hook with a manually engageable handle that serves as a guard for a portion of the latch securing means; further, to provide a hook wherein the rotary latching member is automatically shifted into link or bale securing position as the link or bale is engaged by the hook; and further, to provide improved means for very securely locking the screws that connect the two parts of the latch With the foregoing and other objects in view, my invention consists in certain novel features of construction and arrangement of parts that will hereinafter be more fully described and claimed and illustrated in the accompanying drawing, in which—

Fig. 1 is a side elevational view of a safety latching hook of my improved construction with portions thereof in section for the purpose of clearer illustration.

Fig. 2 is an elevational view similar to Fig. 1 and showing a bale or link engaged by the hook and with the latch in position to lock the bale or link to the hook.

Fig. 3 is an enlarged section taken approximately on the line 3—3 of Fig. 1.

Fig. 4 is an enlarged detail elevational view showing the means for securing in set position the screws that are utilized for connecting the two parts of the latching member of the hook.

Fig. 5 is a cross section taken on the line 5—5 of Fig. 4.

Referring by numerals to the accompanying drawing, which illustrates a practical embodiment of my invention, 10 designates a shank that has the form of a short cylindrical body and formed integral with the lower end thereof, is a hook 11 of approximately 270° in length. The upper end of the shank 10 terminates in a head 12 and arranged for rotation on the shank just below this head is a collar or cross head 13. In order to reduce the friction between the head 12 and collar 13, suitable anti-friction bearings (not shown) are arranged between said head and collar.

Projecting from the collar or cross head 13 are trunnions 14 upon which are pivotally mounted the lower ends of an inverted U-shaped bale 15 by means of which the hook is suspended from the elevator or hoisting apparatus.

Formed integral with the intermediate portion of shank 10, is the upper end of a handle 16, the lower end of which is formed integral with the upper rear portion of hook 11, said handle providing means whereby the hook may be manually engaged while in operation.

The free end of hook 11 terminates in a short outwardly and upwardly projecting nose 16 and the inner face 17 of this nose portion is inclined and extends downwardly and inwardly to meet the inner face of the body of the hook. This arrangement provides a downwardly inclined surface upon which the link or bale may ride while entering the hook.

The inner face of the main body portion of the hook is provided with a centrally arranged circumferentially extending rib 18 and formed at the sides of this rib are flat bearing faces 19.

The rotary latching member 20 that is mounted within the hook is formed in two parts that are practically identical in size, form and construction, said parts being formed so that they are joined on a medial line and formed integral with the outer portions of the two parts of said latching member are marginal flanges 21 that occupy positions to the sides of the rib 18 and the edges of which flanges directly engage the bearing faces 19 that are formed on hook 11 to the sides of said rib 18.

Portions of the members forming the rotary latch are cut away to provide a notch or opening 22 that is approximately 90° in length.

The parts of the latch are firmly secured to each other by means of screws 23 having countersunk heads 24 and to lock said screws against accidental displacement as a result of continued vibration, a small portion of the edge of the head of each screw is, by means of suitable tools, bent downwardly into a recess 25 that is formed in the face of the latch and which recess is formed at the edge of the countersunk opening that receives the head of the screw (see Figs. 4 and 5.)

The arrangement just described provides simple and effective means for locking the screws that connect the parts of the latch and, in the event that it becomes necessary, the screws may be removed by engaging the same with a screw-driver and applying sufficient power thereto to shear the relatively small portion of the edge that is bent downwardly into the recess 25.

Formed in the lower portion of the shank 10 and at the point where the hook 11 joins said shank, is an aperture 26 within which is arranged a detent 27 that is pivoted on a pin or bolt 28 and the point or forward end of said detent normally projects into the circular opening within the hook so as to engage a notch 29 that is formed in the periphery of the latch between the flanges 21. This notch 29 is located so that when the point of the detent is engaged therein, a portion of the rotary latch bridges the opening between the end of the hook and the lower end of shank 10, as illustrated in Fig. 2, and when the latch is thus positioned, the notch 22 is positioned directly above the lowermost portion of the hook and cooperates therewith to form an opening that receives the link or bale 30 that is engaged by the hook.

Bearing on top of the detent adjacent to its free end, is a compression spring 31 that occupies an aperture formed in the lower portion of the shank and the upper end of said spring bearing against a screw plug 32 that is seated in the upper portion of said last mentioned aperture.

Formed integral with and projecting upwardly from the rear end of the detent, is a handle 33 that occupies a position in the opening between the handle 16 and the body of shank 10.

When my improved latching hook is set to receive a link or bale, handle 33 is engaged and drawn toward fixed handle 16, thereby elevating the point of the detent from the notch 29 and the rotary latch is now rotated until the notch 22 coincides with the opening between the point of the hook and the lower end of shank 10 (see Fig. 1).

The hook is now manipulated by manual engagement of the handle 16 so that the upper portion of a link or bale enters the opening between the lower end of shank 10 and the point of hook 11 and as the latching hook is elevated, or as the engaged link or bale is lowered, the upper portion of the latter will bear on the inclined face of notch 22 that is below the point of the hook and this engagement will cause the rotary latch to be rotated in the hook until said rotary latching member entirely closes the opening into the hook, at which time the point of the spring pressed detent will be forced by the pressure of spring 31 into the notch 29 in the rotary latching member, thereby effectually holding the same against reverse rotary motion.

The relative positions of the hook 11 and shank 10 are such that when the engaged link or bale enters the hook as just described, it will travel downwardly on the inclined face 17 and when said link or bale comes to rest at the lowermost point in the hook, it will be in direct axial alignment with shank 10, with the result that the pulling strains impressed on the shank of the hook will be transmitted in direct alignment to the engaged link or bale.

Thus the engagement of the link or bale in the hook is utilized for automatically shifting the rotary latching member to its hook closing position and when said latch is thus positioned, it is positively locked against reverse motion by the spring held detent 27.

The handle 16, formed integral with the rear side of the hook and shank, provides convenient means for manipulating the hook when a link or bale is being engaged or while the hook is being disengaged from a link or bale and said handle 16 performs the function of a guard for the handle 33 of the detent.

Thus it will be seen that I have provided a relatively simple, practical and efficient hook that is especially designed for use in connection with the elevators or hoisting appliances utilized on oil well derricks and which hook is provided with relatively simple means for positively locking within the hook the engaged link or bale that forms a part of the connections to the rods or tubing that are lifted by the elevator.

It will be understood that minor changes in the size, form and construction of the various parts of my improved latching hook may be made and substituted for those herein shown and described without departing from the spirit of my invention, the scope of which is set forth in the appended claims.

I claim as my invention:

1. A latching hook of the character described, comprising a shank, a hook formed integral with one end of said shank, a notched latching member arranged for rotation within the hook, a handle formed integral with said shank and hook, there being an opening formed thru the hook at the point where the same joins the shank, a spring pressed detent extending thru said opening and pivotally mounted therein for engaging and holding the rotary latching member in closed position and a handle formed integral with and projecting upwardly from the rear end of said detent, which handle is arranged between the handle of the hook and the shank thereof.

2. In a latching hook of the character described, a shank, a hook formed integral with one end thereof, the center of the circular opening within said hook intersecting the axial line of the shank, a notched latching member arranged for rotation within the hook and a spring pressed detent pivotally mounted in an opening that is formed thru the upper portion of the hook for locking said latching member in hook closing position.

3. In a latching hook of the character described, a shank, a hook formed integral with one end of said shank, a notched latching member arranged for rotation within said hook, a handle projecting upwardly from the rear portion of said hook, the upper end of which handle is formed integral with the shank and a spring pressed detent pivotally mounted on the lower portion in an opening that is formed thru the shank for locking the rotary latching member in hook closing position and a portion of which detent projects upwardly between said handle and shank.

4. In a latching hook of the character described, a shank, a hook formed integral with the lower end of said shank, a notched latching member arranged for rotation within said hook, there being an opening formed thru the hook adjacent to the point where the same unites with the shank, a spring pressed detent pivotally mounted within said opening for engaging the rotary latching member to hold the same in position to close the hook, a handle formed integral with and projecting upwardly from the rear end of said detent, and a combined hook manipulating handle and guard formed integral with the shank and the upper portion of the hook thereon, which combined handle and guard overlies the handle that projects upwardly from the detent.

In testimony whereof I affix my signature.

WESLEY F. CORNELIUS.